United States Patent
Blais

[11] 3,878,988
[45] Apr. 22, 1975

[54] TRACTION AID FOR VEHICLES

[76] Inventor: Aimé Blais, 1111 Fabre St., Sherbrooke, Quebec, Canada

[22] Filed: Nov. 13, 1973

[21] Appl. No.: 415,310

[52] U.S. Cl..................................... 238/14; 152/208
[51] Int. Cl............................................. E01b 23/00
[58] Field of Search............ 238/14; 152/208; 180/7; 15/236

[56] References Cited
UNITED STATES PATENTS

| | | | |
|---|---|---|---|
| 2,619,289 | 11/1952 | Plante | 238/14 |
| 2,680,567 | 6/1954 | Steven | 238/14 |

*Primary Examiner*—M. Henson Wood, Jr.
*Assistant Examiner*—Richard A. Bertsch

[57] ABSTRACT

A traction aid for a roadwheel of a vehicle of the type arranged to be laid on the ground in engagement with the roadwheel to give traction to the latter. A traction aid of the above type provided with claws constructed and arranged to engage tires of any widths to obtain firm initial engagement with the roadwheel and positive initial traction of the latter. The claws are further arranged to positively engage into cavities between the treads of a tire by a lever action on the traction aid. The traction aid according to the invention further includes traction cleats arranged to bite into the ground and a single U-shape frame having opposite free ends bent to form the claws. The overall width of the traction aid at the level of the claws is less than the width of the major portion of the device and is at the most about equal to the width of the tire tread. Thus, it is easy to insert the claws into engagement with the tire tread cavities, even if the rut in which the tire is located is not any wider than the tire, while good stability of the device is obtained when the tire rides on the same, due to the substantial transverse spacing between the traction cleats.

2 Claims, 3 Drawing Figures

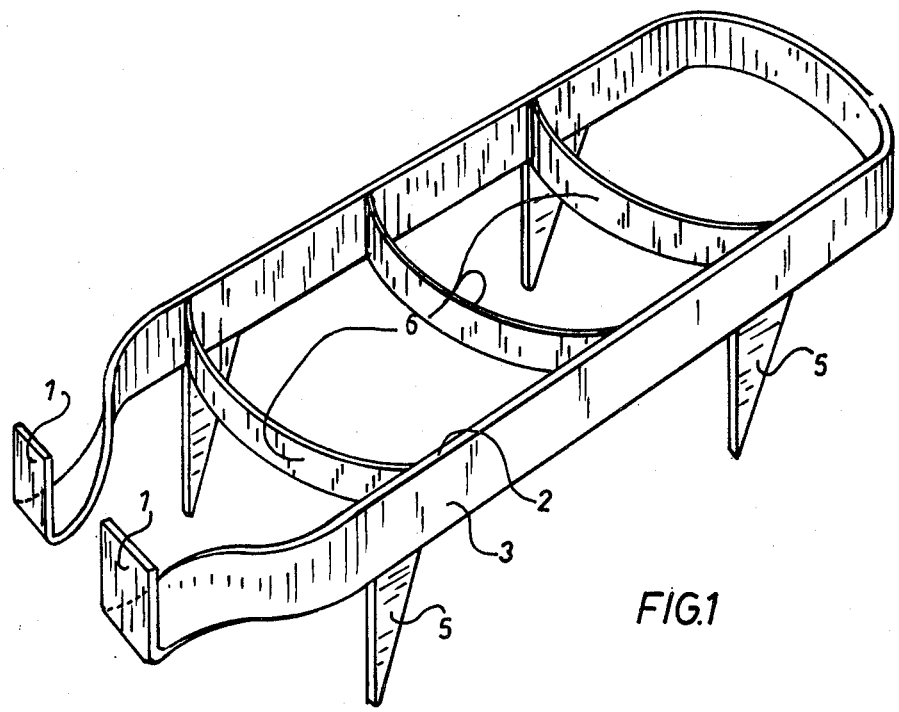
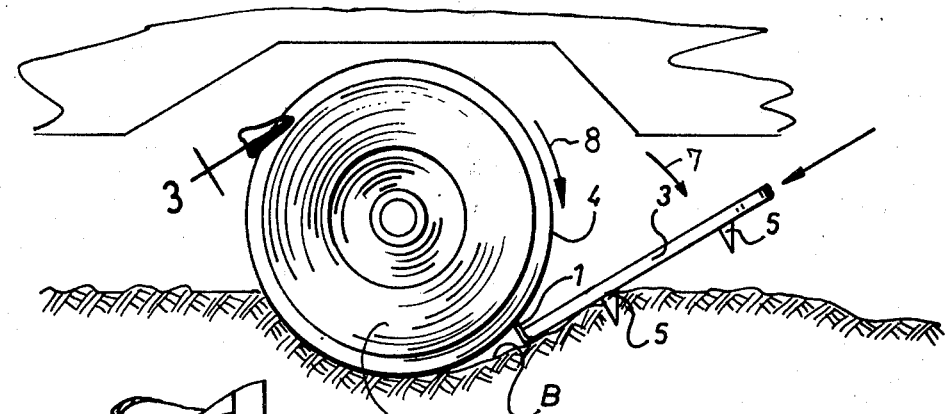
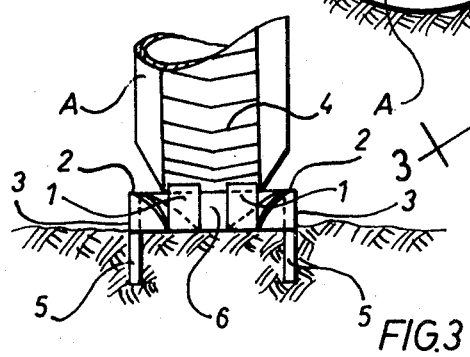

TRACTION AID FOR VEHICLES

This invention relates to a traction aid for vehicles and, more particularly, to a traction aid of the type adapted to be laid on the ground and constructed and arranged to provide traction to a roadwheel running thereon.

The traction aid accessories of the above type which have been proposed or built so far are not completely satisfactory. Up to now, it has been found difficult to obtain positive initial engagement of the roadwheel with the traction aid and there resulted failures of the latter to engage and, therefore, unreliability of the traction performance. There has been proposed a traction aid having elements adapted to engage the sides of a tire to assure initial gripping, but such concept is unsatisfactory, since it produces a traction aid which is not usable with tires of all widths.

The present invention proposes to obviate the above disadvantages of the prior art by providing a traction aid of the above type which includes claws constructed and arranged to engage the cavities between the treads of a tire.

It is a general object of the invention to provide a traction aid of the above type which is adapted to produce positive initial engagement of the traction wheel of a vehicle thereon.

It is a more specific object of the invention to provide a traction aid of the above type which is adapted to accommodate traction wheels of any widths and to produce positive initial engagement therewith.

It is a still more specific object of the invention to provide a traction aid of the above type with claws at one end thereof adapted to engage into cavities between the threads of a tire to cause positive initial engagement and traction of a traction wheel on the traction aid.

It is a further specific object of the invention to provide a traction aid of the above type with claws at one end thereof constructed and arranged to be inserted into cavities between the treads of a tire by a positive lever action when positioning the traction aid in engagement with the tire of a traction wheel.

It is another object of the invention to provide a traction aid of simple construction including a U-shape frame defining a pair of free ends which are bent to form claws arranged to engage into cavities between the treads of a tire and including traction cleats in the form of teeth arranged to bite into the ground.

It is a further object of the invention to provide a traction aid of the above type with tire traction means arranged to relatively evenly engage a tire across the width thereof to minimize slide slipping of a roadwheel running thereon.

The present invention will now be described in detail with reference to a preferred embodiment of the invention illustrated, by way of example only, in the accompanying drawings, in which:

FIG. 1 is a perspective view of a traction aid for a vehicle according to the invention;

FIG. 2 is a side view of a roadwheel of a vehicle and the traction aid of FIG. 1 in cooperation therewith; and FIG. 3 is an end view as seen along line 3—3 in FIG. 2.

The traction aid illustrated includes claws 1 in the form of transversely extending plate portions extending upwardly away from the edge 2 of the longitudinal bars 3. The latter are defined by a U-shape frame having a pair of ends which are bent to form the transversely and upwardly extending rectangular or square plate portions or claws 1 which thus provide transversely aligned top free edge portions spaced from each other which are constructed and arranged to engage into cavities defined in the tread portion 4 of a tire. The claws 1 are offset inwardly from the bars 3 so that the distance between the outer lateral edges is less than the spacing between bars 3.

The longitudinal bars 3 are provided with teeth 5, either integrally formed therewith or otherwise fixed thereto as by welding or the like. The teeth 5 extend downwardly away from the bottom face defined by the above-mentioned frame and are arranged to point into the ground to form traction cleats for the traction aid.

Transverse curved braces 6 are fixed in any well known manner between the longitudinal bars 3 substantially level or slightly above the edge 2 to form traction elements for a roadwheel of a vehicle. The transverse bars or braces 6 are curved to form a convex side towards the claws 1, whereby to be engaged by a tire generally evenly along its length.

The traction aid according to the invention is adapted to be used to produce traction between a traction wheel A of a vehicle and a slippery surface, such as on ice or snow or into a rut B.

The traction aid according to the invention is inserted preferably in a relatively steep position into the nip between the ground and the peripheral tire surface of a roadwheel, such as to cause the claws 1 to engage into selected cavities defined by the tread of the tire, as far as possible towards the bottom of the nip. Thereafter, the traction aid is pivoted towards a lower angular position in the direction of the arrow 7 to cause, by a lever action, firm engagement of the jaws 1 into the selected cavities of the tread and possibly engagement of teeth 5 into the ground. Upon rotation of the roadwheel A in the direction of the arrow 8, the jaws 1 grip the tread of the tire and give traction to the roadwheel relative to the ground.

It will be noted, referring to FIG. 3, that the overall width of the traction aid at the claws 1, as defined by the distance between the outer lateral edges of claws 1, is at the most about equal to the width of the tire tread, while the width of the device at the bars 3 is normally greater than the width of the tire tread. Thus, the claws 1 can be inserted into the tread cavities, even if the rut in which the tire is located is not any wider than the tire, while good stability of the device is obtained when the tire rides on the braces 6 due to the substantial transverse spacing between teeth 5 depending from longitudinal bars 3. As may be seen in the drawing, the U-shaped frame including the transverse brases, are formed of strips of metal which lie transversely of the plane of the frame and the longitudinal bars are twisted through about 90° adjacent said plate portions and the twisted portions converge towards each other in the direction of said plate portions.

I claim:

1. A traction aid for vehicles comprising a U-shaped frame formed of a strip of metal lying transversely of the plane of the U-shape frame and defining longitudinally extending bars with free end portions inwardly bent of the frame and each terminated by a claw defined by a plate portion extending transversely of the U-shape frame and in a plane perpendicular to the plane of said frame, said bars being twisted through about 90° adjacent said plate portions and the twisted portions converging toward each other in the direction of said plate portion, each said claw having a top free edge and an outer lateral edge, the top free edges of the claws being transversely aligned relative to the frame and spaced from each other, the outer lateral edges of said claws being spaced apart a distance less than the distance between said longitudinal bars, and adapted to operatively grip the peripheral surface of the tread of a tire, said claws being integrally formed and rigid with said frame, separate transverse braces formed of a strip of metal lying transversely of the plane of the U-shape frame and traction cleats fixed to said longitudinal bars of said frame and extending outwardly away therefrom in a direction opposite to said top free edges of said claws.

2. A traction aid as claimed in claim 1, wherein said transverse braces are longitudinally curved, having a convex side towards said claws.

* * * * *